United States Patent
Mizuguchi

(10) Patent No.: US 7,184,795 B2
(45) Date of Patent: Feb. 27, 2007

(54) ADAPTIVE ANTENNA TRANSMITTING/RECEIVING APPARATUS

(75) Inventor: Hironori Mizuguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/515,318

(22) PCT Filed: May 22, 2003

(86) PCT No.: PCT/JP03/06384

§ 371 (c)(1),
(2), (4) Date: Nov. 23, 2004

(87) PCT Pub. No.: WO03/101010

PCT Pub. Date: Dec. 4, 2003

(65) Prior Publication Data

US 2005/0245284 A1  Nov. 3, 2005

(30) Foreign Application Priority Data

May 23, 2002 (JP) .............................. 2002-149274

(51) Int. Cl.
*H04M 1/00* (2006.01)
(52) U.S. Cl. ................. 455/562.1; 455/73; 455/561
(58) Field of Classification Search ............ 455/562.1, 455/112, 137, 132, 189.1, 226.1–226.3, 73, 455/561, 115.1, 103, 108, 102, 189
See application file for complete search history.

(56) References Cited

U.S. PATENT DOCUMENTS 6,240,149 B1 *  5/2001  Yukitomo et al. .......... 375/347
6,442,405 B1 *  8/2002  Hiramatsu et al. ....... 455/562.1
6,954,615 B2 * 10/2005  Sano ........................ 455/41.1

FOREIGN PATENT DOCUMENTS

JP  2000-022611  1/2000

(Continued)

OTHER PUBLICATIONS

S. Tanaka et al., "Field Experiments on Coherent Adaptiv Antenna Array Diversity Receiver for W-CDMA Reverse Link," Technical Report of IEICE, A-P99-130, RCS99-127 (Oct. 1999), pp. 45-50, no month listed.

(Continued)

*Primary Examiner*—Joseph Feild
*Assistant Examiner*—Jaime Holliday
(74) *Attorney, Agent, or Firm*—Young & Thompson

(57) ABSTRACT

Reception quality measuring circuit (107) measures the reception quality of received data delivered from adder (103). When the reception quality measured by reception quality measuring circuit (107) is less than a certain threshold value, transmission antenna weight control circuit (108) applies multipliers ($106_1$–$196_N$) with stored transmission antenna weights, that is, transmission antenna weight W" stored therein when the reception quality exceeded the threshold value at the last time, instead of transmission antenna weights W' generated by antenna weight converting circuit (105).

3 Claims, 2 Drawing Sheets

FOREIGN PATENT DOCUMENTS

| | | |
|---|---|---|
| JP | 2000-332666 | 11/2000 |
| JP | 2001-94488 | 4/2001 |
| JP | 2001-217759 | 8/2001 |
| JP | 2001-333051 | 11/2001 |
| JP | 2002-26790 | 1/2002 |
| JP | 2002-111565 | 4/2002 |
| JP | 2003-158479 | 5/2003 |
| WO | 02/33851 | 4/2002 |

OTHER PUBLICATIONS

Shinya Tanaka et al., "Pilot Symbol-Assisted Decision-Directed Coherent Adaptive Array Diversity for DS-CDMA Mobile Radio Reverse Link," IEICE Trans Fundamentals, vol. E80-A, No. 12, Dec. 12, 1997, pp. 2445-2454.

NTT DoCoMo Technical Journal, vol. 8, No. 1, pp. 1-10, Apr. 2000.

* cited by examiner

ADAPTIVE ANTENNA TRANSMITTING/RECEIVING APPARATUS

TECHNICAL FIELD

The present invention relates to an adaptive antenna transmitting/receiving apparatus which is a transmitting/receiving apparatus using an adaptive antenna, and more particularly, to an adaptive antenna transmitting/receiving apparatus which generates transmission antenna weights based on reception antenna weights.

BACKGROUND ART

Generally, in mobile transmission systems, interference from other users, i.e., multi-user interference is a significant factor to limit the system capacity. Thus, for increasing the system capacity, an adaptive antenna technique is considered effective since it suppresses a received signal in a particular direction (interfering wave direction) during reception, and avoids interference in unnecessary directions during transmission.

FIG. 1 illustrates a prior art example of a transmitting/receiving apparatus using such an adaptive antenna (adaptive antenna transmitting/receiving apparatus). As illustrated in FIG. 1, this conventional adaptive antenna transmitting/receiving apparatus comprises N antenna elements $101_1$–$101_N$, N multipliers $102_1$–$102_N$, adder 103, reception antenna weight generating circuit 104, antenna weight converting circuit 105, and N multipliers $106_1$–$106_N$.

Multipliers $102_1$–$102_N$ perform weighted multiplications by multiplying received signals from antenna elements $101_1$–$101_N$ by reception antenna weights W=($w_1$, $w_2$, . . . , $w_N$) generated by reception antenna weight generating circuit 104, respectively. Adder 103 adds together the received signals of the respective antennas weighted by multipliers $102_1$–$102_N$ to deliver as single received data.

Reception antenna weight generating circuit 104 is applied with the received data delivered from adder 103, and generates weighting coefficients which permit the received data to have an optimal value as reception antenna weights W.

The operation of reception antenna weight generating circuit 104 is generally implemented by MMSE (minimum Mean Squared Error) control which adaptively updates weighting coefficients to minimize a mean squared error of weighted and added received signals and a reference signal. Known algorithms for realizing MMSE include LMS (Least Mean Square) and RLS (Recursive Least Square) algorithms, and the like. In the present invention, no limitations are particularly imposed to the algorithm used in reception antenna weight generating circuit 104.

Reception antenna weights W=($w_1$, $w_2$, . . . , $w_N$) generated by reception antenna weight generating circuit 104 are used for weighting received signals in multipliers $102_1$–$102_N$, and are also applied to antenna weight converting circuit 105.

Antenna weight converting circuit 105 converts reception antenna weights W generated by reception antenna weight generating circuit 104 to transmission antenna weights W'=($w'_1$, $w'_2$, . . . , $w'_N$). This conversion is performed for correcting an amplitude/phase deviation among branches of an RF transmitting circuit, or for correcting a frequency difference of transmission/reception when transmission/reception are different in frequency as an FDD (Frequency Division Duplex) system, and is basically performed with the intention to generate transmission weights W' for forming a similar pattern to a directivity pattern formed in the reception.

Multipliers $106_1$–$106_N$ multiply data to be transmitted by transmission antenna weights W' delivered from antenna weight converting circuit 105, respectively.

In the conventional adaptive antenna transmitting/receiving apparatus illustrated in FIG. 1, a plurality of N antenna elements $101_1$–$101_N$ are arranged in an array, and weighting coefficients of respective antenna elements $101_1$–$101_N$ are adaptively controlled through signal processing to conduct a control for increasing an antenna gain (directivity) in a particular direction. On the other hand, in transmission, the reception antenna weights are calibrated to generate transmission antenna weights which are multiplied by signals to be transmitted of respective users, such that the resulting signal are transmitted to have the directivity in a desired wave user direction and to reduce interference given to other user directions. An adaptive antenna transmitting/receiving apparatus in such a configuration is described in literature [1] listed below.

Literature [2] listed below shows a system for controlling reception antenna weights so as to minimize a mean squared error after RAKE combination generated using a despread pilot symbol and a determination information data symbol as reference signals, for example, as a method of calculating optimal reception weights.

Also, literature [3] listed below describes a method of using transmission antenna weights which are generated based on antenna weights generated as described above, as a method of generating transmission antenna weights.

[1] NTT DoCoMo Technical Journal, Vol. 8, No. 1 (April 2000);

[2] S. Tanaka, M. Sawahashi and F. Adachi, "Pilot symbol-assisted decision-directed coherent adaptive array diversity for DS-CDMA mobile radio reverse link", IEICE Trans. Fundamentals, Vol. E80-A, pp. 2445–2454, (December, 1997); and

[3] Tanaka, Harada, Ihara, Sawahashi and Adachi, "Outdoor experiment characteristics of adaptive antenna array diversity reception in W-CDMA, Technical Report RCS99–127, pp. 45–50 (October 1999).

In the conventional adaptive antenna transmitting/receiving apparatus illustrated in FIG. 1, the transmission antenna weights are generated based on the reception antenna weights generated for reception. This is intended to apply the directivity pattern formed during reception, as it is, to transmission. However, if the apparatus fails to generate optimal antenna weights, for example:

(1) when the generation of reception antenna weights is in course of convergence, so that optimal weights have not been formed;

(2) when the reception line quality is so bad that the generation of optimal reception antenna weights encounters difficulties;

(3) when the reception line is instantaneously interrupted due to shadowing or the like;

(4) when a failure in the apparatus or the like results in defective reception, and the like, the transmission antenna weights are not either optimized. For this reason, it is contemplated that not only the directivity is not formed for a desired station, but also larger interference is given to other users by contraries, resulting in a significant degradation of the transmission characteristic as well as the reception characteristic.

Conventional techniques for controlling transmission antenna weights to have optimal values are described in JP-2000-22611-A, JP-2001-217759-A, and the like.

JP-2000-22611-A describes an adaptive antenna transmitting/receiving apparatus which comprises an incoming direction estimating circuit, and estimates an incoming direction by the incoming direction estimating circuit to correct transmission antenna weights. However, this conventional adaptive antenna transmitting/receiving apparatus cannot estimate an incoming direction if the reception line quality is degraded, resulting in the inability to control optimal transmission weights, and possible erroneous control conducted in some cases to significantly degrade the transmission characteristic.

JP-2001-217759-A in turn describes an adaptive antenna transmitting/receiving apparatus which controls transmission antenna weights based on an interference degree calculated by an interference degree calculating unit. However, this conventional adaptive antenna transmitting/receiving apparatus is similar in that it cannot calculate the interference degree itself if the reception line quality is degraded, resulting in the inability to control optimal transmission weights, and possible erroneous control conducted in some cases to significantly degrade the transmission characteristic.

DISCLOSURE OF THE INVENTION

It is an object of the present invention to provide an adaptive antenna transmitting/receiving apparatus which is capable of preventing the transmission characteristic from significantly degrading when optimal reception antenna weights cannot be generated.

To achieve the above object, an adaptive antenna transmitting/receiving apparatus of the present invention comprises:

a plurality of antenna elements;

a plurality of first multipliers for performing a weighted multiplication by multiplying received signals from the plurality of antenna elements by reception antenna weights, respectively;

an adder for adding together the received signals of the respective antennas weighted by the plurality of first multipliers to deliver as single received data;

a reception quality measuring circuit for measuring a reception quality of the received data delivered from the adder;

reception antenna weight generating circuit applied with the received data delivered from the adder for generating weighting coefficients which permit the received data to have an optimal value, as the reception antenna weights;

an antenna weight converting circuit for converting the reception antenna weights generated by the reception antenna weight generating circuit into transmission antenna weights;

a transmission antenna weight control circuit for delivering the transmission antenna weights delivered from the antenna weight converting circuit and stored therein the delivered transmission antenna weights when the reception quality measured by the reception quality measuring circuit exceeds a previously set threshold value, and for delivering the stored transmission antenna weights instead of the transmission antenna weights delivered from the antenna weight converting circuit when the reception quality is less than the threshold value; and a plurality of second multipliers for multiplying data to be transmitted by the transmission antenna weights delivered from the transmission antenna weight control circuit, respectively.

According to the present invention, the reception quality circuit measures the reception quality of received data, and the transmission antenna weight control circuit does not use the transmission antenna weights generated by the antenna weight converting circuit as they are, but uses stored transmission antenna weights, i.e., the transmission antenna weights when the reception quality exceeded the threshold value at the last time, when the reception quality is less than the previously set threshold value, thus making it possible to prevent the antenna elements from being controlled with erroneous transmission antenna weights to significantly degrade the transmission characteristic.

Also, another adaptive antenna transmitting/receiving apparatus of the present invention further comprises a reception quality measuring circuit for measuring the reception quality of received data delivered from the adder, and a transmission antenna weight control circuit, wherein the transmission antenna weight control circuit delivers the transmission antenna weights delivered from the antenna weight converting circuit, as they are, when the reception quality measured by the reception quality measuring circuit exceeds the previously set threshold value, and delivers previously set values instead of the transmission antenna weights delivered from the antenna weight converting circuit, as the transmission antenna weights, when the reception quality is less than the threshold value.

According to the present invention, the reception quality circuit measures the reception quality of received data, and the transmission antenna weight control circuit does not use the transmission antenna weights generated by the antenna weight converting circuit as they are, but uses the previously set values as the transmission antennas, when the reception quality is less than the previously set threshold value, thus making it possible to prevent the antenna elements from being controlled with erroneous transmission antenna weights to significantly degrade the transmission characteristic.

Also, the transmission antenna weight control circuit may deliver the previously set values which have a value only for a weight corresponding to a particular antenna element and zero for all the remaining weights corresponding to the other antenna elements, as the transmission antenna weights.

Further, the reception quality measuring circuit may measure the reception quality based on any of a signal-to-noise power ratio, a bit error rate, and a block error rate of the received data which is the output of the adder circuit.

It is an object of the present invention to provide an adaptive antenna transmitting/receiving apparatus which is capable of preventing the transmission characteristic from significantly degrading when optimal reception antenna weights cannot be generated.

To achieve the above object, an adaptive antenna transmitting/receiving apparatus of the present invention comprises:

a plurality of antenna elements;

a plurality of first multipliers for performing a weighted multiplication by multiplying received signals from the plurality of antenna elements by reception antenna weights, respectively;

an adder for adding together the received signals of the respective antennas weighted by the plurality of first multipliers to deliver as single received data;

a reception quality measuring circuit for measuring a reception quality of the received data delivered from the adder;

reception antenna weight generating circuit applied with the received data delivered from the adder for generating weighting coefficients which permit the received data to have an optimal value, as the reception antenna weights;

an antenna weight converting circuit for converting the reception antenna weights generated by the reception antenna weight generating circuit into transmission antenna weights;

a transmission antenna weight control circuit for delivering the transmission antenna weights delivered from the antenna weight converting circuit and stored therein the delivered transmission antenna weights when the reception quality measured by the reception quality measuring circuit exceeds a previously set threshold value, and for delivering the stored transmission antenna weights instead of the transmission antenna weights delivered from the antenna weight converting circuit when the reception quality is less than the threshold value; and a plurality of second multipliers for multiplying data to be transmitted by the transmission antenna weights delivered from the transmission antenna weight control circuit, respectively.

According to the present invention, the reception quality circuit measures the reception quality of received data, and the transmission antenna weight control circuit does not use the transmission antenna weights generated by the antenna weight converting circuit as they are, but uses stored transmission antenna weights, i.e., the transmission antenna weights when the reception quality exceeded the threshold value at the last time, when the reception quality is less than the previously set threshold value, thus making it possible to prevent the antenna elements from being controlled with erroneous transmission antenna weights to significantly degrade the transmission characteristic.

Also, another adaptive antenna transmitting/receiving apparatus of the present invention further comprises a reception quality measuring circuit for measuring the reception quality of received data delivered from the adder, and a transmission antenna weight control circuit, wherein the transmission antenna weight control circuit delivers the transmission antenna weights delivered from the antenna weight converting circuit, as they are, when the reception quality measured by the reception quality measuring circuit exceeds the previously set threshold value, and delivers previously set values instead of the transmission antenna weights delivered from the antenna weight converting circuit, as the transmission antenna weights, when the reception quality is less than the threshold value.

According to the present invention, the reception quality circuit measures the reception quality of received data, and the transmission antenna weight control circuit does not use the transmission antenna weights generated by the antenna weight converting circuit as they are, but uses the previously set values as the transmission antennas, when the reception quality is less than the previously set threshold value, thus making it possible to prevent the antenna elements from being controlled with erroneous transmission antenna weights to significantly degrade the transmission characteristic.

Also, the transmission antenna weight control circuit may deliver the previously set values which has a value only for a weight corresponding to a particular antenna element and zero for all the remaining weights corresponding to the other antenna elements, as the transmission antenna weights.

Further, the reception quality measuring circuit may measures the reception quality based on any of signal-to-noise power ratio, a bit error rate, and a block error rate of the received data which is the output of the adder circuit.

BEST MODE FOR CARRYING OUT THE INVENTION

Next, one embodiment of the present invention will be described in detail with reference to the drawings.

Figure 1:
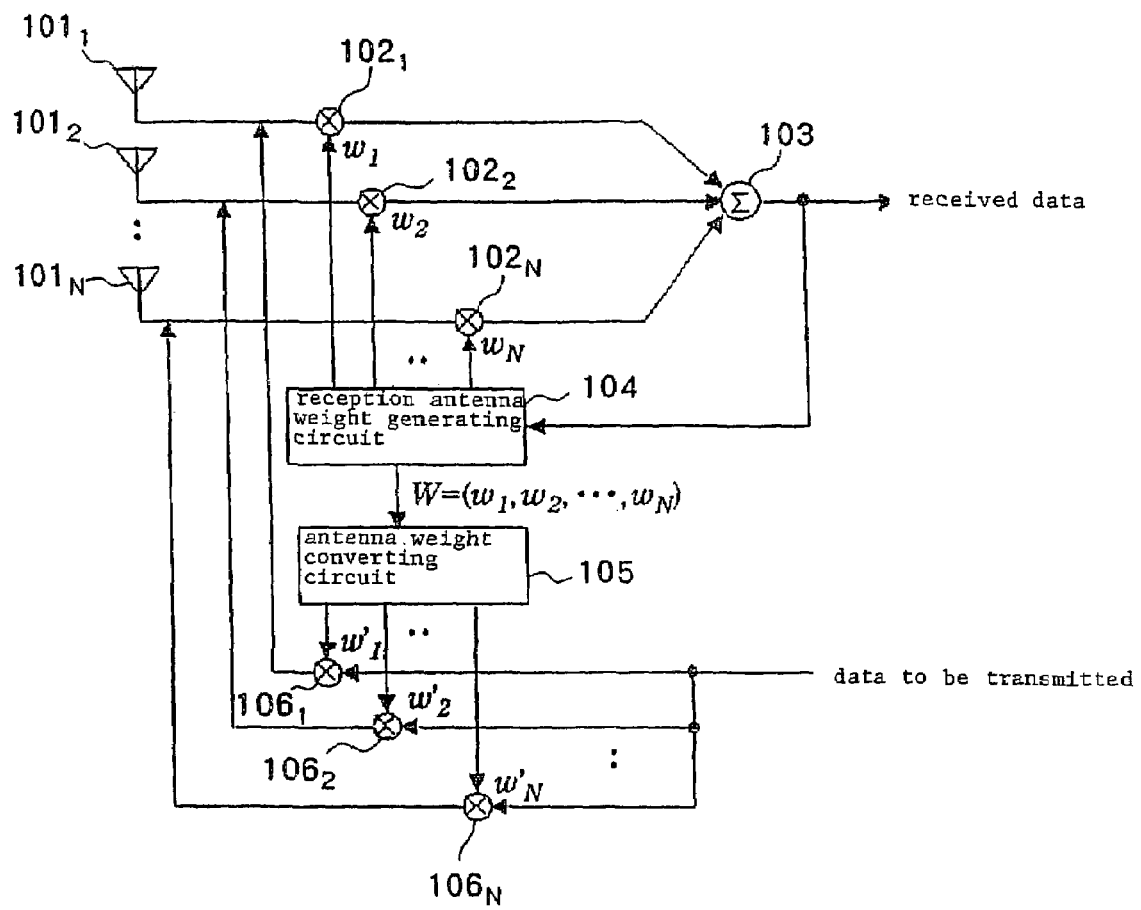
FIG. 1 is a block diagram illustrating the configuration of a conventional adaptive antenna transmitting/receiving apparatus.
Figure 2:
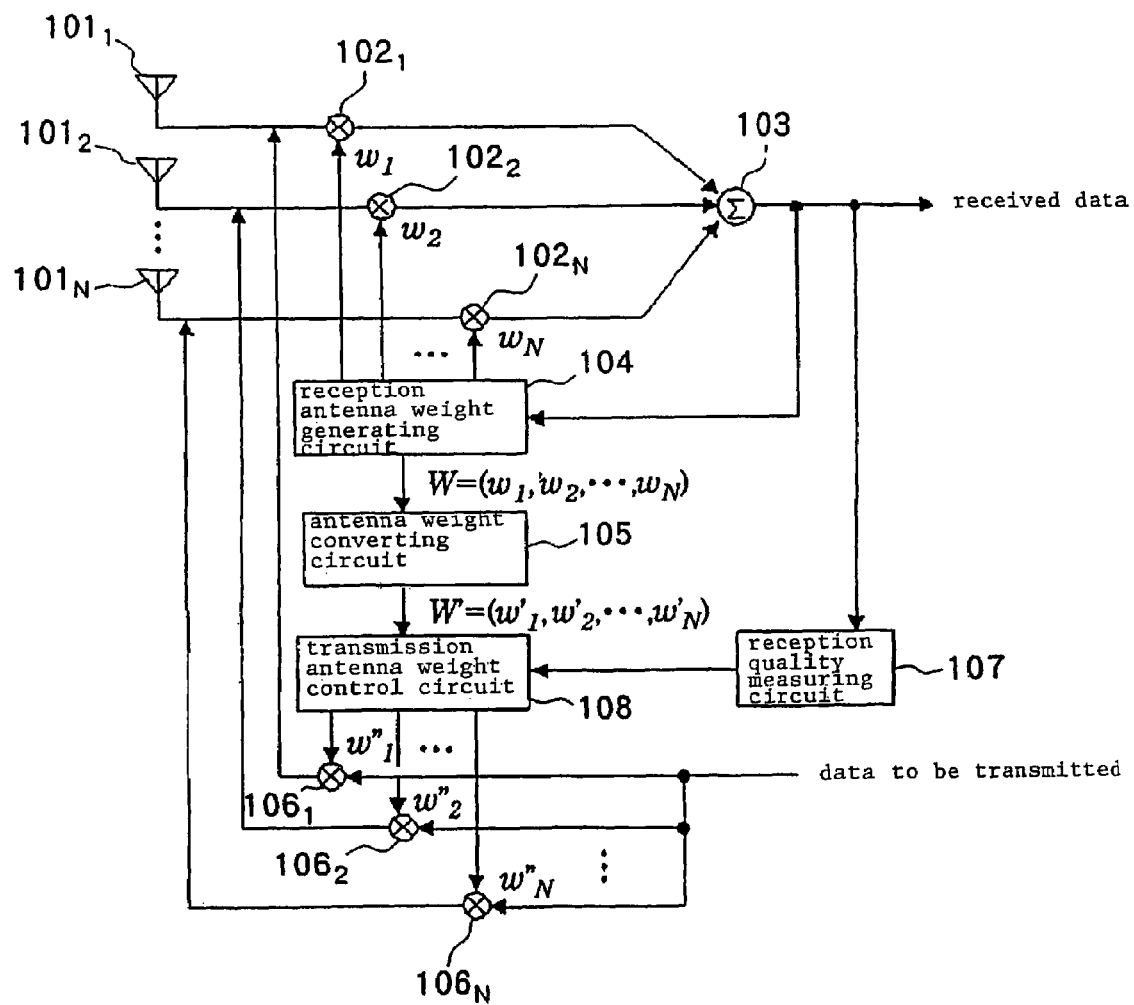
FIG. 2 is a block diagram illustrating the configuration of an adaptive antenna transmitting/receiving apparatus according to one embodiment of the present invention.

FIG. 2 is a block diagram illustrating the configuration of an adaptive antenna transmitting/receiving apparatus according to one embodiment of the present invention. In FIG. 2, components identical to the components in FIG. 1 are designated the same reference numerals, and description thereon is omitted.

The adaptive antenna transmitting/receiving apparatus of this embodiment additionally comprises reception quality measuring circuit 107, and transmission antenna weight control circuit 108, added to the conventional adaptive antenna transmitting/receiving apparatus illustrated in FIG. 1.

In the adaptive antenna transmitting/receiving apparatus of this embodiment, since transmission antenna weight control circuit 108 is provided between antenna weight converting circuit 105 and multipliers $106_1$–$106_N$, multipliers $106_1$–$106_N$ in this embodiment do not multiply data to be transmitted by transmission antenna weights W' delivered from antenna weight converting circuit 105, but multiply the data to be transmitted by transmission antenna weight W'' delivered from transmission antenna weight control circuit 108.

This embodiment is characterized in that reception quality measuring circuit 107 and transmission antenna weight control circuit 108 are provided in an adaptive antenna transmitting/receiving apparatus for generating transmission antenna weights based on reception antenna weights.

Reception quality measuring circuit 107 measures the reception quality of received data delivered from adder 103 by calculating SIR (Signal-to-Noise power Ratio), BER (Bit Error Rate), BLER (BLock Error Rate), or the like for notification to transmission antenna weight control circuit 108.

Transmission antenna weight control circuit 108 is applied with transmission antenna weights W' which are the outputs of antenna weight converting circuit 105, and the reception quality which is the output of reception quality measuring circuit 107 for determining transmission antenna weights W''. Specifically, transmission antenna weight control circuit 108 determines whether or not transmission antenna weights W' converted by antenna weight converting circuit 105 are actually used. The criterion for the determination used herein is the reception quality measured by reception quality measuring circuit 107.

Transmission antenna weight control circuit 108 delivers transmission antenna weights W' from antenna weight converting circuit 105, as they are, to multipliers 106₁–106₂, when the reception quality measured by reception quality measuring circuit 107 exceeds a previously set threshold value.

Then, transmission antenna weight control circuit 108 conducts a control such that the transmission antenna weights, which are the outputs of antenna weight converting circuit 105, are not used as they are, when the reception quality is less than the threshold value.

As an example of this control, previously calculated antenna weights may be continuously used as they are, for example, when the reception quality is less than a certain threshold value, such that the transmission antenna weights are not updated. In this event, transmission antenna weight control circuit 108 compares the reception quality, which is the output of reception quality measuring circuit 108, with a previously set threshold value, and delivers the transmission antenna weights, which are the outputs of antenna weight converting circuit 105, to multipliers $106_1$–$106_N$ as they are, when the reception quality exceeds the threshold value, and stores therein the delivered transmission antenna weights. Then, when the reception quality is less than the threshold value, transmission antenna weight control circuit 108 delivers the stored transmission antenna weights (the transmission antenna weight when the reception quality exceeded the threshold value at the last time) instead of the transmission antenna weights which are the outputs of antenna weight converting circuit 105.

In this way, an erroneous detection in an incoming direction due to a degradation in reception characteristic can be prevented from affecting the transmission antenna weights.

Alternatively, transmission antenna weight control circuit 108 may deliver previously set values to multipliers $106_1$–$106_N$ as transmission antenna weights W" instead of transmission antenna weights W' delivered from antenna weight converting circuit 105 when the reception quality measured by reception quality measuring circuit 107 is less than a previously defined threshold value.

The previously set values are, for example, W"=(1,0, . . . ,0), i.e., weighting coefficients having a value only for a weight corresponding to a particular antenna element, and zero for the others, such as $w_1$=(1.0,0.0), $w_2$–$w_N$=(0.0,0.0).

Such a control, if conducted, will lose a directivity gain during transmission which has been provided when reception antenna weight generating circuit 104 is correctly estimating an incoming direction, but can avoid reception antenna weight generating circuit 104 from making an error in estimating an incoming direction to cause a danger of erroneously forming the directivity to other than a desired station upon transmission, and giving interference to other users. Also, when an instantaneous interruption extends for a long time to cause a large change in incoming direction, it is possible to prevent a degradation in characteristic, on the contrary, because the transmission directivity cannot follow.

The invention claimed is:

1. An adaptive antenna transmitting/receiving apparatus comprising:
a plurality of antenna elements;
a plurality of first multipliers for performing a weighted multiplication by multiplying received signals from said plurality of antenna elements by reception antenna weights, respectively;
an adder for adding together the received signals of the respective antennas weighted by said plurality of first multipliers to deliver as single received data;
a reception quality measuring circuit for measuring a reception quality of the received data delivered from said adder; reception antenna weight generating circuit applied with the received data delivered from said adder for generating weighting coefficients which permit the received data to have an optimal value, as said reception antenna weights;
an antenna weight converting circuit for converting the reception antenna weights generated by said reception antenna weight generating circuit into transmission antenna weights;
a transmission antenna weight control circuit that includes a memory that stores (a) a set of fixed transmission antenna weights, (b) a transmission quality threshold, and (c) a most recent set of the transmission antenna weights delivered from said antenna weight converting circuit when the reception quality measured by said reception quality measuring circuit exceeds the transmission quality threshold stored in said memory,
said transmission weight control circuit delivering the transmission antenna weights delivered from said antenna weight converting circuit when the reception quality measure by said reception quality measuring circuit exceeds the transmission quality threshold stored in said memory and delivering one of the fixed transmission antenna weights and the most recent set of the transmission antenna weights when the reception quality measured by said reception quality measuring circuit is less than the transmission quality threshold stored in said memory; and
a plurality of second multipliers for multiplying data to be transmitted by the transmission antenna weight delivered from said transmission antenna weight control circuit, respectively.

2. The adaptive antenna transmitting/receiving apparatus of claim 1, wherein said transmission weight control circuit delivers the fixed transmission antenna weights when the reception quality measured by said reception quality measuring circuit is less than the transmission quality threshold stored in said memory.

3. The adaptive antenna transmitting/receiving apparatus of claim 1, wherein said transmission weight control circuit delivers the most recent set of the transmission antenna weights when the reception quality measured by said reception quality measuring circuit is less than the transmission quality threshold stored in said memory.

* * * * *